3,068,349
WELDING PLASTIC COATED SHEET
Thomas Francis Tribe, Dudley, Worcester, England, assignor to British Federal Welder and Machine Company Limited
No Drawing. Filed Oct. 14, 1960, Ser. No. 62,558
Claims priority, application Great Britain May 25, 1960
1 Claim. (Cl. 219—91)

The present invention concerns projection welding of components to the rear (uncoated) surface of sheet material coated on its front surface with thermo-plastic material, for instance welding attachment bolts to the sheet by which it may be secured in position.

It is required that the components shall be welded to the rear surface of the sheet material without spoiling the plastic coating due either to softening of the coating material while electrode pressure is maintained with the consequence that a local depression is formed on the coating surface or because the transfer of heat to the coating material destroys, at least in part, the adhesion between the plastic coating and the metal with the possible production of gas between the coating and the metal resulting in a bubble in the softened plastic coating.

According to this invention a method of projection welding components to the rear surface of a plastic coated sheet is characterised in that the welding electrode is pressed against the component to be welded (after welding has been performed) for such time as will ensure that a substantial part of the welding heat is conducted away through the electrode, the electrode being withdrawn from the component before the plastic coating is softened to any marked extent. For convenience the time during which the electrode is maintained in contact with the component after welding of the component to the sheet material is referred to as the "dwell time."

It is necessary to determine the dwell time largely by trial and error dependent upon the nature of the plastic coating, the metal of the sheet material and its thickness, the amount of energy required to cause fusion during welding—which is determined in part by the size and distribution of the projections, e.g., on the components and by the size of the welding electrode amongst other factors. In determining the dwell time it will be appreciated that by maintaining the welding electrode against the component after welding, the electrode being of a copper alloy ensures that most of the heat generated during welding is rapidly conducted away from the sheet material and from the component through the electrode but that some heat must also be conducted through the sheet and towards the plastic coating. If the amount of heat conducted through the sheet to the plastic coating is sufficient and if thereafter the electrode is maintained under pressure in contact with the component the plastic coating, which will be softened by the heat conducted to it through the sheet material, will be flattened locally under the electrode pressure and this will mark the surface of the plastic coating. Accordingly the maximum permissible dwell time must be selected so that any undesirable marking of the plastic coating due to pressure thereon in the manner indicated is avoided. On the other hand if heat is not conducted away through the electrode to a sufficient extent the heat passing through the sheet material may attain such a value as to spoil the adhesion between the plastic coating and the sheet material with the formation of a local bubble as referred to above. The minimum dwell time is therefore determined by the requirement that heat shall be conducted away from the component at such a rate and for such a time as will prevent the formation of bubbles.

With increase in the thickness of the sheet material the permitted range of the dwell time to meet the requirements referred to above becomes less critical since there is a greater body of sheet material which will assist in dissipating the heat before this is conducted to the plastic coating to an extent such as will spoil the coating in the manner indicated above. It will therefore be appreciated that the dwell time must be accurately maintained with thin sheet materials and by way of example the following table indicates the range of permitted dwell times for sheet steel of different thicknesses. In both cases the rear surface of the sheet steel is zinc coated and the front surface of the sheet is coated with P.V.C. to a thickness of .01 of an inch.

| Steel Thickness, gauge | Minimum dwell time, sec. | Maximum dwell time, sec. |
|---|---|---|
| 18 | 0.16 | 0.40 |
| 22 | 0.16 | 0.20 |

The weld time for 18 gauge is one cycle (i.e., 0.02 sec.) and for 22 gauge is one-half cycle (i.e., 0.01 sec.). The electrode pressure for 18 gauge is 85 lbs. per projection and for 22 gauge it is also 85 lbs. per projection. All of the values which are given are indications only of the kind of values which are to be expected and are not specific figures obtained during tests or in production.

It is necessary that the weld time and the dwell time be accurately controlled.

To reduce the welding current the component is applied to the sheet material at a smaller pressure than is normally used so that the interfacial resistance is increased. Thus, the pressures given above compare with pressures of 125 lbs. for both 18 gauge and 22 gauge which would normally be used.

Pressure is required to apply the electrode to the component and also to apply an electrical contact to the sheet material and it is preferred that the electrode and the contact shall be applied by independent pressure systems, e.g., by separate air cylinders or by separate springs which are suitably loaded.

The material of the die upon which the coated face rests during welding is not important and a conventional rigid metal die, e.g., of copper alloy may be used since the heat conductivity of plastic materials is so low that a metal die (e.g., of copper alloy) will not conduct heat to the plastic coating to any significant extent.

By the expression thermo-plastic material is to be understood not only synthetic resin but similar substances such as rubber which become plastic on being heated.

I claim:

A method of projection welding a metal component to the rear uncoated surface of a metal sheet coated on its front surface with thermo-plastic material which consists in supporting the front coated surface of the sheet, pressing the component against the rear surface of the sheet by way of a welding electrode having high heat conductivity which is pressed against the component, causing a welding current to flow through the electrode, the component and the sheet to weld the component to the sheet, stopping the welding current whilst maintaining the electrode pressed against the component, and regulating the optimum dwell time for which the electrode is pressed against the component after cessation of welding current flow between a minimum value, above which heat is conducted away through the electrode to a sufficient extent to prevent spoiling of the adhesion between the plastic coating and the metal sheet, and a maximum value below which the plastic coating is not sufficiently softened due to dissipation of welding heat as to be locally marked by the electrode pressure.

References Cited in the file of this patent
UNITED STATES PATENTS 2,087,530    Potchen _____ July 20, 1937